(12) United States Patent
Camer

(10) Patent No.: US 6,675,150 B1
(45) Date of Patent: Jan. 6, 2004

(54) METHOD FOR DEPLOYING MULTIPLELY OCCUPIED VEHICLES TO MEET THE MOBILITY NEEDS IN A DENSELY POPULATED URBAN AREA

(76) Inventor: Dorothy Camer, 7008 Aspen Ave., Takoma Park, MD (US) 20912

( * ) Notice: Subject to any disclaimer, the term of this patent is extended or adjusted under 35 U.S.C. 154(b) by 391 days.

(21) Appl. No.: 09/713,406

(22) Filed: Nov. 16, 2000

(51) Int. Cl.[7] ............................................. G06F 17/60
(52) U.S. Cl. ............................................. 705/8; 705/6
(58) Field of Search ............................................ 705/8

(56) References Cited

U.S. PATENT DOCUMENTS

| | | | | |
|---|---|---|---|---|
| 4,092,718 A | * | 5/1978 | Wendt | 701/117 |
| 4,360,875 A | * | 11/1982 | Behnke | 455/456 |
| 5,168,451 A | * | 12/1992 | Bolger | 701/117 |
| 5,953,706 A | * | 9/1999 | Patel | 705/6 |
| 6,212,393 B1 | * | 4/2001 | Suarez et al. | 455/456 |
| 6,240,362 B1 | * | 5/2001 | Gaspard, II | 701/209 |
| 6,339,745 B1 | * | 1/2002 | Novik | 701/208 |
| 6,430,496 B1 | * | 8/2002 | Smith et al. | 701/117 |

FOREIGN PATENT DOCUMENTS

JP        09115012 A   *   5/1997

OTHER PUBLICATIONS

Benson, Miles. "Out of Driver's Seat Aging Boomers to Put Strain on Transportation," Newhouse News Service, 1997. [Proquest].*
"Portland to be Model for Senior Transportation Seniors Who Are Unable to Drive Still Need to Get Around," Portland Press Herald, Aug. 27, 1997. [Proquest].*
Volz, Joe. "Pooling Resources Nondriving Seniors use Several Kinds of Ride Services," Richmond Times, Sep. 30, 1996. [Proquest].*
"Variety of Programs Keeps People Moving . . . " Portland Press Herald, May 18, 1997. [Proquest].*
"Taxi drivers and chauffeurs," Occupational Outlook Handbook, 1998/1999. [Proquest].*
Martorana, Jamie. "Doing Business With: / Limousine Companies / . . . " Newsday, Dec. 21, 1998. [Proquest].*
"Vectorlink Joins Growing List of GDT VARs; Internet System Provides Fleet Management for Small Firms," Business Wire, May 12, 1998.*
Cabanatuan, Michael. "Casual Carpoolers, Go Home / S.F. pickup spots ready for evening commute," San Francisco Chronicle, Oct. 6, 1997.*
"NMDC opens ride share program on Internet," Bangor Daily News, Oct. 20, 1997.*
Laura Higgins, James B. Laughlin, and Katherine Turnbull: "Automatic Vehicle Location and Advanced Paratransit Scheduling at Houston METROLift".
Anthony Pagano, Paul Metaxatos, and Mark King: "Computer–Aided Scheduling and Dispatching System: Impacts on Operations and Coordination" by.

* cited by examiner

*Primary Examiner*—Tariq R. Hafiz
*Assistant Examiner*—Catherine M. Colón

(57) ABSTRACT

A method, apparatus, and program for efficiently deploying vehicles to meet the mobility needs in a densely populated urban area. By subscribing to a service which can broker with drivers on a 24/7 basis, a rider in a metropolitan area will be able to travel around the area at any time without dependence on private car ownership. The broker can group the riders with similar travel needs to facilitate a single vehicle accomplishing the trip in an economical, convenient, speedy vehicle and safe mode that will be a viable alternative to individual driving. Such service will help to reduce traffic congestion thus adding even more to the speed of the trip.

The method may also be used in less densely populated areas, e.g. rural, to aviod the need to widen or build highways.

2 Claims, 5 Drawing Sheets

METHOD FOR DEPLOYING MULTIPLELY OCCUPIED VEHICLES TO MEET THE MOBILITY NEEDS IN A DENSELY POPULATED URBAN AREA

The method may also be used in less densely populated area, e.g. rural, to avoid the need to widen or build highways.

BACKGROUND OF THE INVENTION

The present invention relates to the field of scheduling and dispatching transportation service for profit to improve mobility in densely populated urban areas for riders without physical mobility limitations.

Transportation is an important part of everyone's life. Movement of people and goods is essential to the healthy economy of an urban area which has largely relied on private vehicles for accomplishing that task. Growth in urban areas has made such reliance increasingly ineffective and extremely expensive in money, space, energy and ecological consequences. Yet a healthy urban economy requires a smooth and efficient transportation system.

The modes of travel available to most people in urban areas are transit either rail or bus, car or van pool, taxi, private car, motorized bikes, bicycle, foot or some combination of them.

The increasing congestion on roads has caused governments to give more attention to transit since the 1960s, but it has proven too inflexible, unreliable and slow to meet the needs of many urban residents, who generally must make one or more transfers to reach their destination. Each transfer increases the travel time. Waiting at bus stops or transit stations exposes the rider to crime as well as discomfort. Transit has generally concentrated on servicing routes rather than individuals. The routes are designed to cover large areas so that a single rider must accept indirect travel to reach the desired destination. This can add considerable to the rider's travel time.

Experimentation with customized travel (paratransit) by transit agencies has been generally limited to service in low density areas or for seniors and for the mobility limited population under the American Disability Act never to high density urban areas for general mobility. Their use of some elements of the logistic technology have not proven economical because agency constraints on the service limiting the population served and the hours of service.

Another inconvenience of public transit is the requirement for payment at time of service which generally necessitates the rider to carry cash in a credit card society. SmartCard and passes have relieved this to some extent.

In the Washington D.C. area rail transit has reached its capacity and government subsidies are not available to expand. Car and vanpooling has provided some relief. Carpools are dependent on a willing unpaid driver and is rarely available for trips other than to and from the workplace. Because the car driver is a private individual, it is prohibitive for her/him to carry insurance for his riders so they dependent on their own insurance.

Vanpools are generally sponsored by an employer or business since the cost of vans is considerably more than cars. While insurance is carried on the van, the use of a non-professional driver in employment situations still subjects the riders to greater risk. In cases where professional drivers are used, the limitation of service restricts the points of travel or increases the travel time. Hotel shuttles, for example, may be limited to trips to and from the airport at specific hours. Independent airport shuttles on the other hand are expensive because of the small number of riders available for the service. The size of the rider pool frequently requires tortuous routing to serve each rider, thus adding time and distance to the trip.

Carpools and most most vanpools do not address the non-work trips for shopping and entertainment that enhances city life. In a high pressure society where time is scarce, the average person depend on a car to meet travel needs. In the Washington, D.C. area as in many urban areas, many people who use transit still need to drive to rail and bus stops. Once a person owns a car, the tendency is to use it since the major cost is the capital cost of the vehicle. The cost of car ownership averages $6000 or about 11% of annual income. The instability of fuel prices creates considerable anxiety for middle income riders. In addition to the operating and capital cost, there are parking fees and traffic tickets and personal time spend in maintaing and parking the car.

Taxis which can deliver customized service is unaffordable to most for regular trips. The car owner will only relinquish the vehicle if there is assurance of total mobility needs being met.

The high use of private cars has pushed roadways beyond the limit of their capacity. Traffic gridlock has become a way of life in large cities. Studies on the D.C. area found that the average driver spends 72 hours a year in gridlock, amount to 240 billion hours for the area. This wastes not only the personal time of the residents but also detracts from the labor productivity available to the economy.

More highways and infrastructure has been demonstrated to be only a short term solution since they reach capacity very quickly after completion and encourage more traffic rather than diverting much traffic from existing roads. Construction has become increasingly controversial and challenged by environmental interests groups, so that approval for construction takes almost as long as the actual task.

SUMMARY OF THE INVENTION

This method has the advantage of flexibility not provided by transit which has been traditionally route-oriented and of economy over taxi because grouped riders share the expense of the trip. The only long term solution to reducing traffic without decreasing mobility is to more efficiently deploy vehicles so that one vehicle can carry multiple passengers with similar origin, destination, and time of travel.

The average annual cost to a subscriber for such service can be less than the cost of car ownership. Each trip is customized to the actual needs of the riders so that the trip is faster than regular route transit. It is more convenient than express bus or rail because service is from door to door. In those cases where express bus or rail will be more efficient, the service will deliver the rider to the stop or station to meet the bus or train and provide SmartCards or passes to the rider as needed. If the 55% of solo drivers reported to dislike driving alone were grouped into 3 or more persons in a vehicle operated by a professional driver, traffic will be reduced by more than one-third.

The present method combines the economy of the internet with highly developed logistics technology for moving vehicles to the point of need and with the communication advantage of wireless mobile devices to alert the driver around traffic congestion as well as locate a driver when a spontaneous travel request is phoned in.

There is little or no wait time for the rider because the vehicle comes to the location at an agreed time. Without the need to drive one's own car, the anxiety of fuel price instability is negligible. The rider saves time and cost when freed of car maintainence.

For the drivers the advantages will be assurance of a steady revenue not generally available to taxi or shuttle services. That assurance combined with efficient dispatching that reduces waste mileage and idle time produces a greater return per hour than for other entrepreneurial driver services.

For both rider and driver safety is increased. Riders do not have to wait at lonely bus stops. Private drivers are not frustrated by, unfamiliar roads and directions. Professional drivers are not threatened by having to pick up strangers off the street, nor are they the target of crime since no money is exchanged at the time of travel.

With more professional drivers and less private drivers car accidents will decrease and road rage will become rare. As more and more riders subscribe to the service, more cars will be taken off the road and less gridlock will occur. When gridlock does occur, central dispatchers monitoring traffic alerts can notify the affected driver using the wireless communication device and assist the driver to redirect the trip.

The advantages to the community are many. Grouping riders in a common area to travel together provides time for community interaction. With less time spent traveling, more time is available for home and work. Less car on the road means less ecological damage.

When applied in less densely populated areas, e.g. rual, the competitive advantage to a subscriber may be less than in a city, but to the governing entity the time and cost of the system and time to implement would be much less than road infrastructure, e.g. widening or building highways. In such cases where the costs to the subscriber is less attractive, the decrease in taxes or state subsidy may encourage implementing the method.

DETAILED DESCRIPTION OF THE PREFERRED EMBODIMENTS

The present invention is directed to a system to improve mobility by reducing dependency on private car ownership. Traditional methods of improving transit or use of car and vanpools have not been successful because of demand for more customized service and better use of time.

This method is directed to matching riders, into groups so that their specific needs can be met by a single driver without loss of time and with increase in economy. Convenience over regular transit is achieved by pick up at the origin requested and drop off at the requested destination rather than requiring the rider to go to common locations such as bus stops and rail stations.

This method is particularly efficient because the marginal increase of cost per rider is minimal while the improvement of service per rider increases as a greater pool of riders permits closer matching of trip origins, destinations and time of travel. In addition the more riders that are serviced means less traffic on the roads and thus less travel time lost in traffic congestion.

Figure 1:
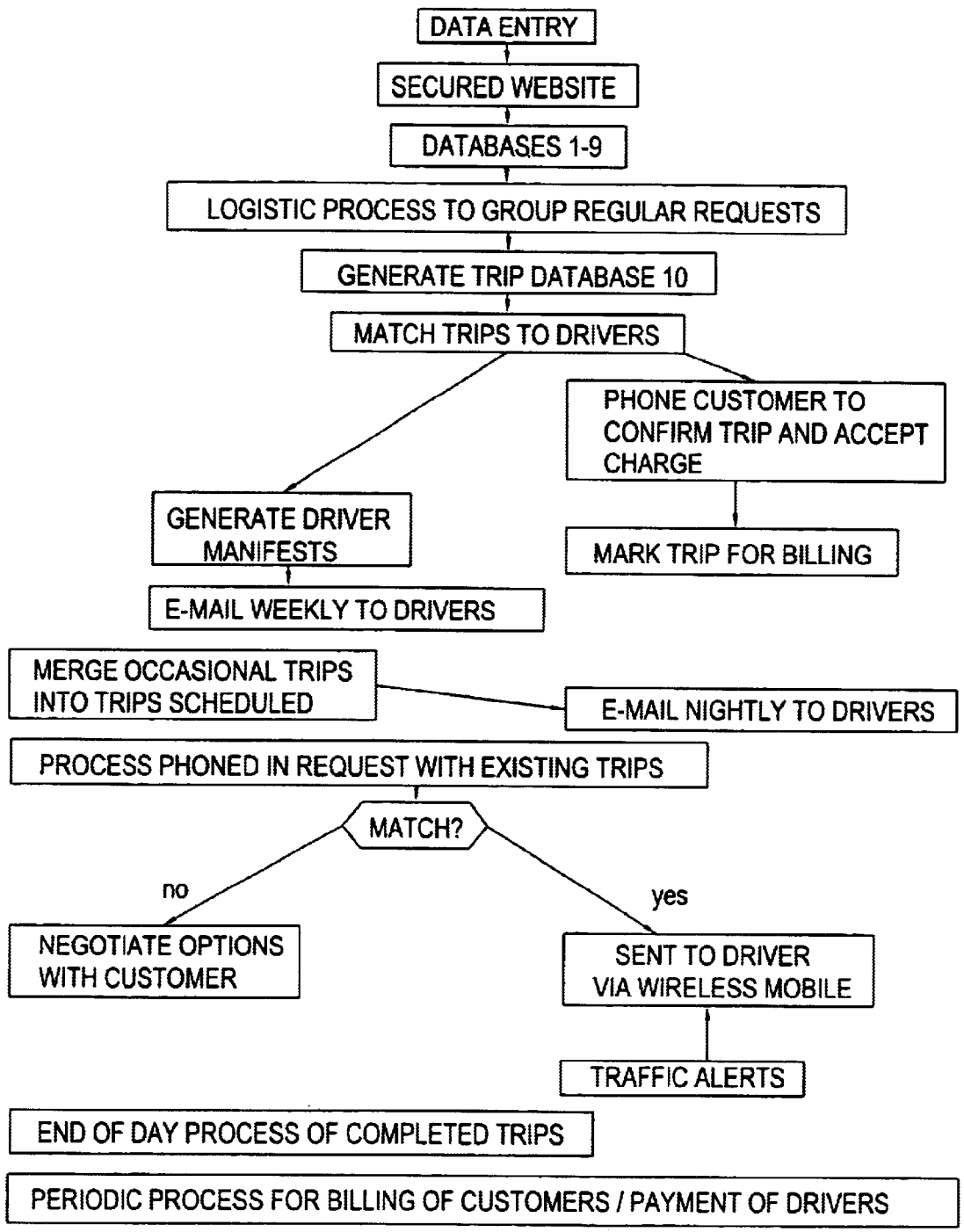
FIG. 1 is a diagram of the preferred interaction of the elements of the invention.

FIG. 1 is an overall diagram showing the elements of the system. These are an economical data entry for riders and drivers, an advanced logistic program which can group the regular requests into trips that can be assigned to each driver, and fast, efficient communication with the drivers when required for changes and traffic alerts. The use of periodic billing and payment is an added convenience for both rider and driver. It imparts greater assurance of payment by riders and to drivers.

Figure 2:
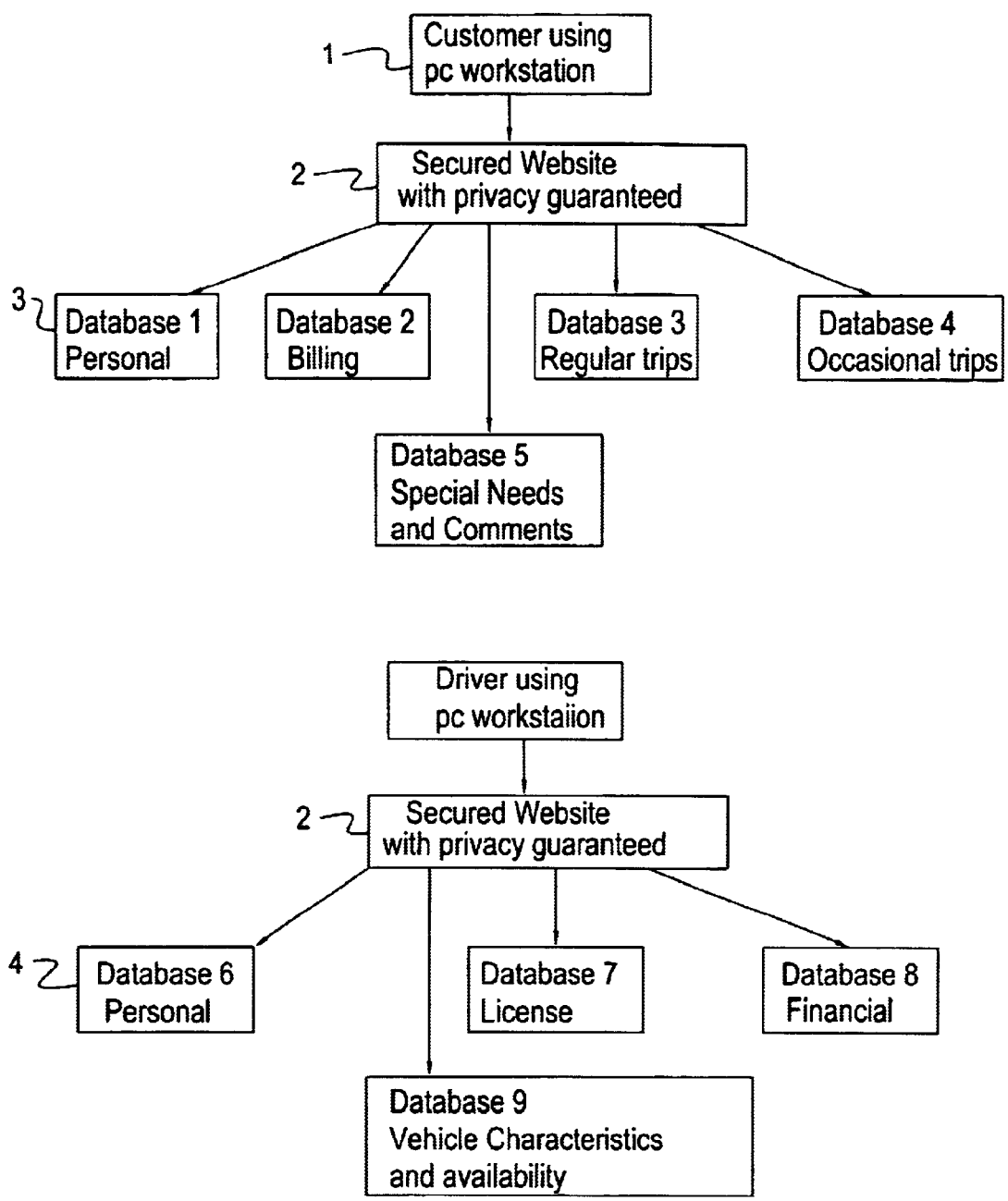
FIG. 2 is a diagram of an economical secure data entry system

FIG. 2 shows the data entry process. Riders subscribe by entering their data using any personal computer workstation at home, libraries, community centers, etc. 1 Confidentiality of the data is ensure through a secured web site 2. The data is separated into databases with functional purposes 3. Personal data of name, address, phone number, etc. is entered in one database, billing data into another. The billing data in Database 2 may contain the name and address of an employer and or other agency which is willing to cover the cost of a trip. It also accepts credit card for charging and bank account data if automated deduction is to be authorized.

Databases 1 and 2 are control by the rider who have exclusive write access. Database 3 is used to stored the regular trip requests. A rider may enter any regular trip, e.g. to and from work on weekdays, a trip to school in the evenings or weekends. The data must include origin, destination, time and frequency. Database 4 contains occasional trips such as a trip to the grocery store or theater. These trips do not have to include time and frequency. The latter may be added by the rider or scheduler when the request is definite. Database 5 stores any special needs, e.g. child seat and comments to assist in providing personalized service. The scheduler will be able to make notation in Database 3 and 4 when the request is assigned to a driver. The scheduler may also add comments as the situation arises to clarify the needs of the customer. The customer/subscriber has access to all five databases to make changes or corrections.

Drivers also enter their data using a pc workstation via the same secured web site 2. Their data is separated into 4 four databases. Database 6 stores their personal information, name, address, etc. along with their experience and any related information that they may wish to share with the service. Their licensing data must be entered fully into Database 7. This data is used to monitor the currency of permission to drive in areas of operation. Their financial data, e.g. bank account data, is entered into Database 8 for automated payment which is the only way payments will be made. Database 9 stores the characteristics of vehicle to be used, e.g. passenger capacity along with the times and area that the driver is available for service.

Figure 3:
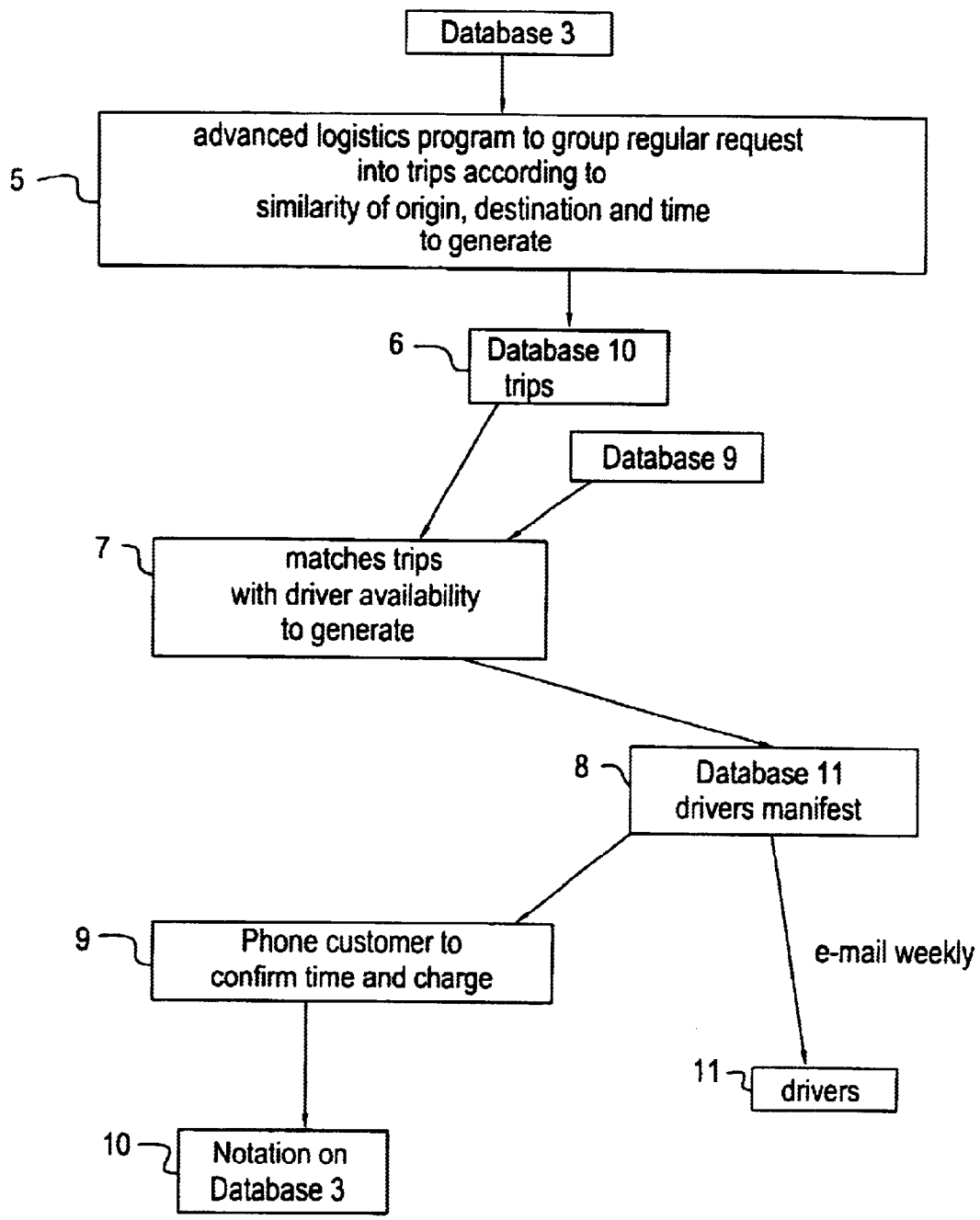
FIG. 3 is a flow diagram of the subscription scheduling/dispatch procedure

FIG. 3 shows the process for arranging trips for regular requests. The riders' requests stored in Database 3 are 5 grouped according to similarity in origin, destination and time of travel. The trips needed to meet the requests are stored 6 in Database 10 which is then processed 7 with database 9 to generate the trip manifest 8 for each driver. Trips are assigned to drivers so that the initial origin of the first trip and the final destination of the last trip is close to the driver's starting location. Each subsequent trip is assigned so that the origin is close to the destination of the previous trip. This is done to save wasted mileage. Assignments are rotated among the drivers to ensure that all have revenue. Each rider is contacted by 9 phone to confirm the trip and charges. This is done initially and whenever a change is made. Notations 10 are made in Database 3 with actual time and trip assigned. After the rider confirms the trip, the manifests are e-mailed 11 to the drivers once a week.

Figure 4:
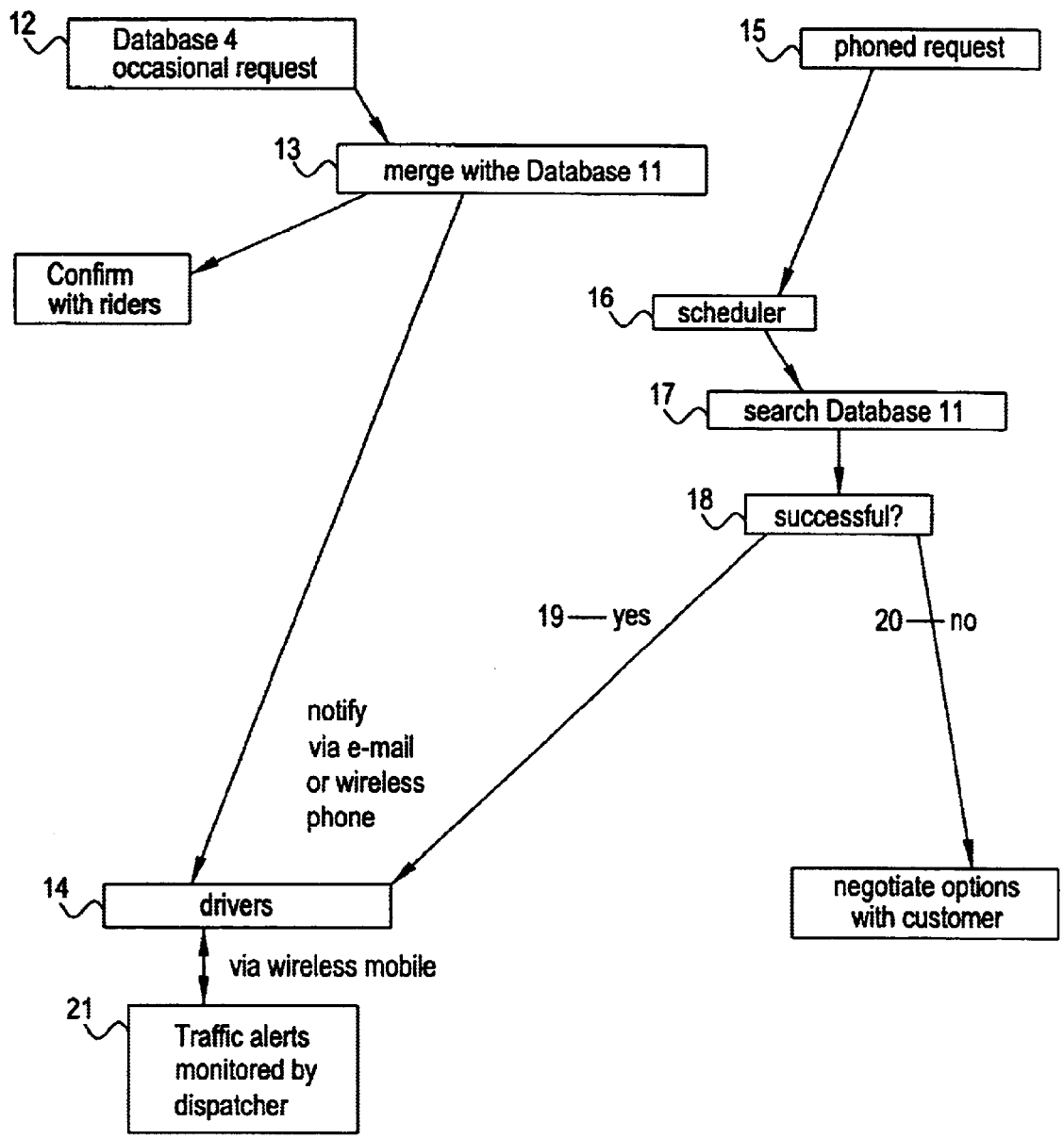
FIG. 4 is a flow diagram of the demand/response handling of trip requests

FIG. 4 Trips that are made occasionally or without regularity fall into the category of demand/response. Riders may enter these requests at any time, either through the internet or phoning to the scheduler for entry into Database 4. Database 4 is examined daily 12 for specific requests, i.e. a trip with origin, destination, time and date greater than the current date. These are accumulated and processed each night 13. The trip is confirmed with the rider and added 14 to the driver's nightly manifest, which contains only changes to the weekly manifest.

Requests which are phoned in 15 for immediate response are handled by the scheduler, who searchs 17 Database 11 to find a match 18. If a match is found, the scheduler notifies 19 the driver via wireless communication device with voice, text, and vehicle location capability. This is done while the rider is on the phone. If the driver confirms the ability to accomodate the rider, the scheduler notifies the rider with the time the driver will arrive and adds the trip to Database 4. If one driver cannot assume the service, the scheduler continues to search until a driver is found.

If no match can be found 20, the scheduler notifies the rider and offers one of three options: holding the request until a match can be found, offering a special trip by a standby driver at a premium rate (sometimes taxis), or a car rental at an hourly rate for the duration of the trip. If the rider's time is flexible, waiting for other similar requests to come in may be a feasible option over the expense of special trip or individual driving. Car rental (sharing) will only be available if the rider has entered the driver's license and insurance on Database 1 and credit card or bank account in Database 2.

Traffic alerts 21 are monitored by the dispatcher continuously and communicated to an affected driver via wireless phone so that the driver can avoid congestion.

Figure 5:
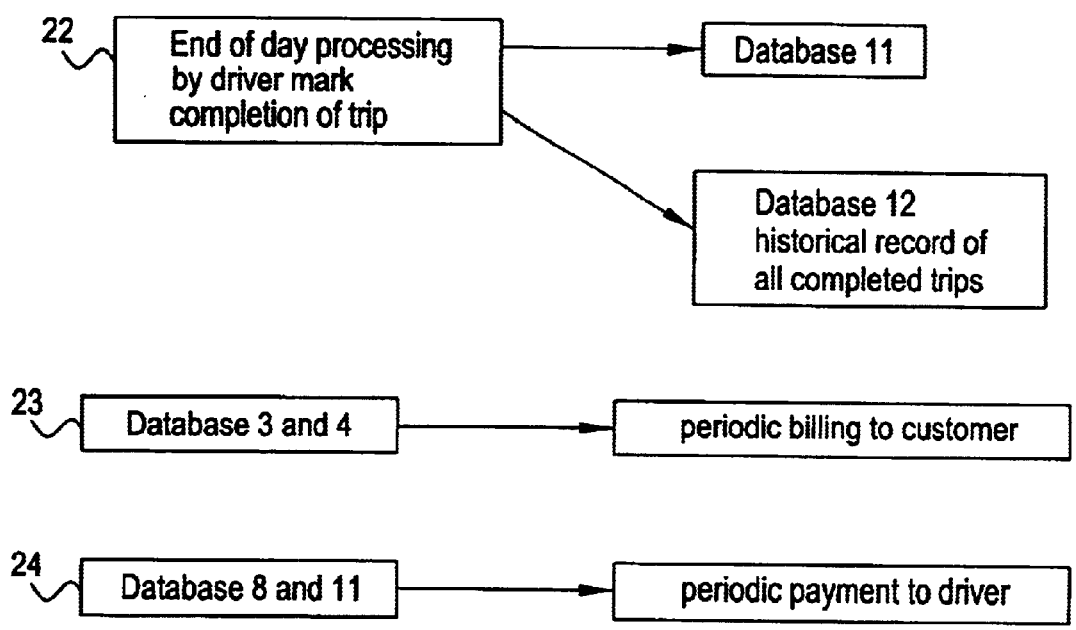
FIG. 5 is a diagram of related procedures to complete the system

FIG. 5 depicts the final processing. At the end of each day, drivers entered the results of their trips 22 with appropriate comments into Databases 11 and 12, which stores a historical record of all completed trips. Periodically, probably monthly, Databases 2–4 are used to process 23 statements to the subscriber and payment by credit cards or bank deduction if authorized. Wherever possible, statements will be distributed by the drivers with the next trip after the statement is prepared. Drivers may receive payments in sealed envelopes from subscribers who do not wish to pay by credit card or automated bank deduction. Those subscribers who wish to pay by cash will be able to do so at selected banks. Periodically, probably weekly, payment statements for services will be generated 24 and drivers will be paid using Databases 8 and 11. Payment will only be made through deposit to a bank account. This type of processing will greatly reduce mail costs.

The present invention has been described in terms of specific embodiments. It is to, be understood that the invention is not limited to the disclosed embodiments but to any modifications or equivalent processes included within the spirit and scope of the appended claims.

I claim:

1. A method to service the local mobility needs of riders in a densely populated urban area using internet data entry and integrated geographic systems to group similar rider trip requirements on a long term basis, said method comprising the following steps:

receiving from a subscriber/rider directly into a first database personal data including family members, if applicable, billing data, said rider's anticipated regular and occasional trip requests for a known period of time, said trip requests consisting of date, desired pick-up time, departure location, drop-off location, frequency, and characteristics of said rider having physical mobility restrictions and locations of said trip requests limited only by the urban area of service;

itemizing and merging all trip requests for all riders by date, desired pick-up time, departure location and drop-off location;

organizing said merged trip requests into subgroups of 3–7 similar individual trip requests at least weekly;

verifying with each rider his/her trip requests for a month to insure that all trips requested are serviced correctly;

notifying each rider the driver identity and time of each pick-up and drop-off for each date service will be delivered, wherein said driver is an independent licensed driver contracted to fulfill each subgroup trip request comprising the following steps:

receiving from said driver personal, vehicle characteristics, availability and license data for said driver and vehicle directly into a second database;

matching the driver availability to the subgroup trip requests;

sequencing the trip requests to minimize downtime and wasted mileage for each driver;

contracting with said driver to fulfill each rider's trip requests by picking up the rider at the curb of the departure location and delivering said rider to the curb of the drop-off location;

generating a weekly manifest for each driver wherein the manifest identifies each rider's name with their trip requests; and communicating traffic alerts directly to affected driver to facilitate the trip requests;

wherein immediate payment for services is avoided by generating and mailing at the end of a billing period, an invoice for services received to each rider; and generating a statement at the end of each contract period to make payment to each driver for services performed.

2. A method of claim 1 wherein trip requests require less than weekly service comprising the following steps:

receiving a trip request at the central office from a rider/subscriber whose personal and billing data have already been received in the first database;

holding the rider/subscriber on the line while identifying a trip request already on a manifest of a driver;

communicating with said driver to determine the feasibility of adding the new trip request to said driver's manifest;

confirming while still in communication with the rider that the trip request can be met;

adding the trip request to the rider's itemized trip requests for the period; and adding the trip requests to the driver's statement for the period.

* * * * *